Jan. 1, 1963  B. I. ULINSKI  3,071,388
CASTER WHEEL MOUNTING
Filed June 22, 1961  2 Sheets-Sheet 1
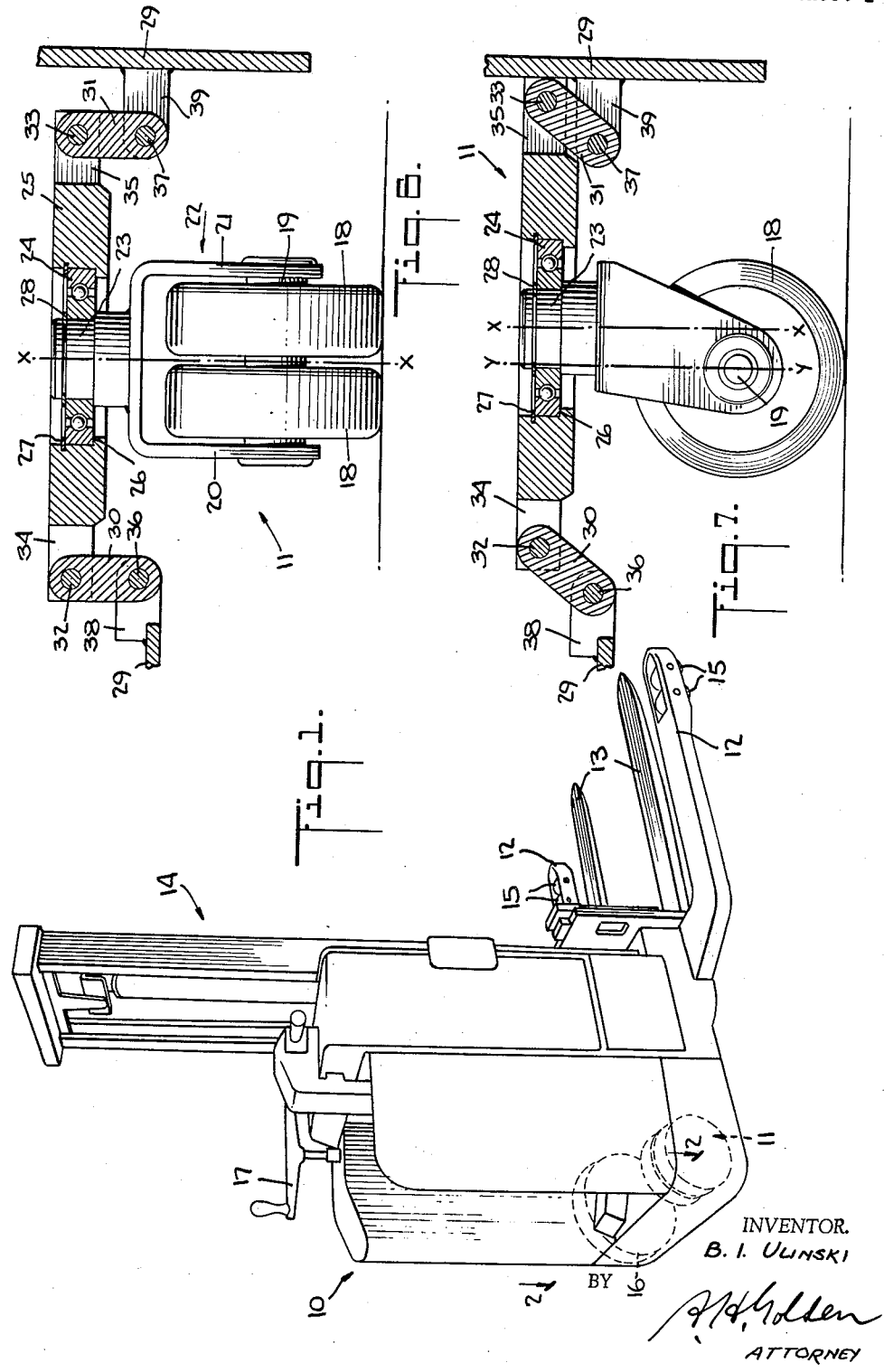
INVENTOR.
B. I. ULINSKI
BY
ATTORNEY

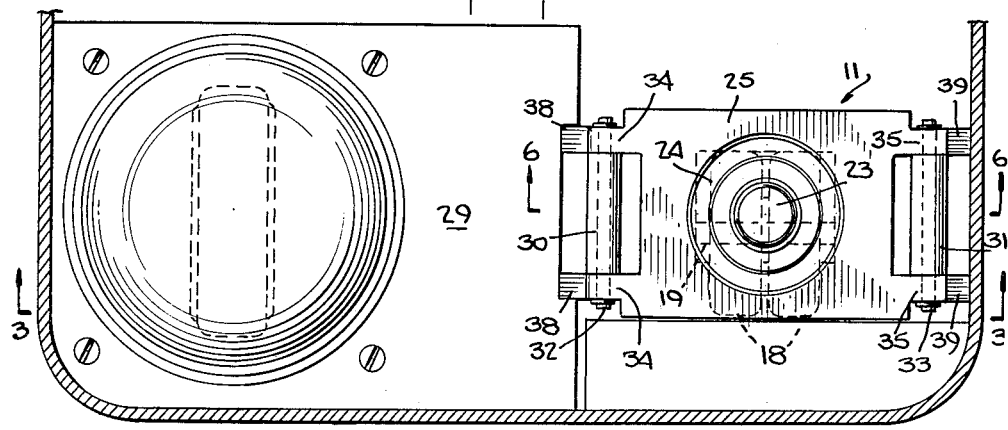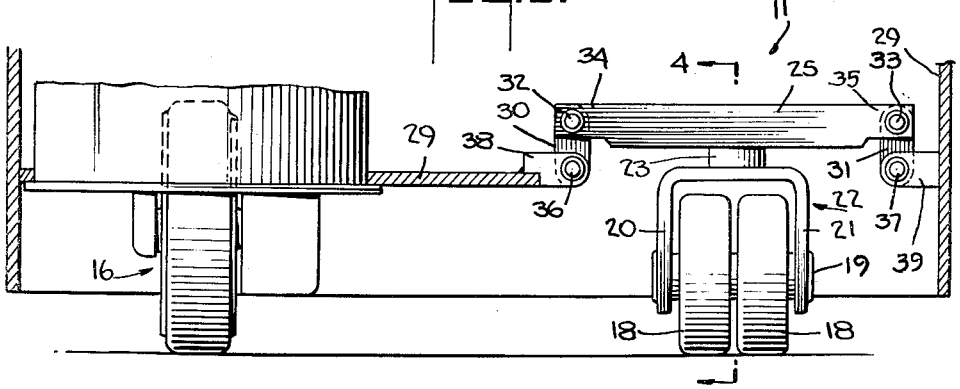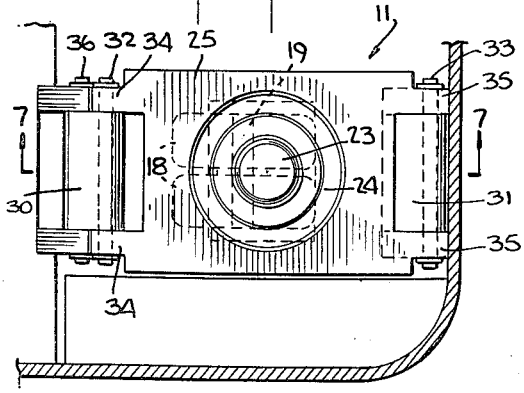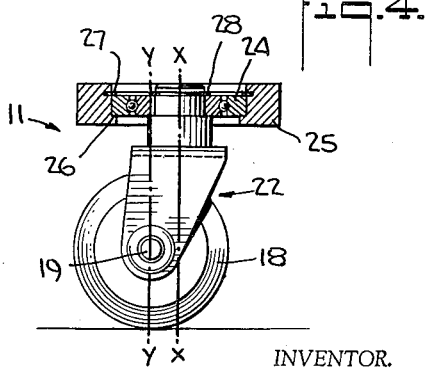

United States Patent Office 3,071,388
Patented Jan. 1, 1963

3,071,388
CASTER WHEEL MOUNTING
Bronislaus I. Ulinski, Flossmoor, Ill., assignor to The Yale and Towne Manufacturing Company, Stamford, Conn., a corporation of Connecticut
Filed June 22, 1961, Ser. No. 118,942
3 Claims. (Cl. 280—79.1)

This invention relates to an industrial truck and, more particularly, to the mounting of a caster wheel unit on such a truck.

Industrial trucks frequently use one or more caster wheels as supporting wheels because caster wheels are self-steering and swing into the proper direction in accordance with changes in the direction of movement of the truck.

When the direction of movement of a truck incorporating a caster wheel is completely reversed, the caster wheel unit must swing 180° about its caster axis. In caster wheel arrangements as heretofore proposed, in order for the caster wheel to swing the 180°, the caster wheel either has to scrape relatively to the floor or the truck has to shift sidewise relatively to the floor, with resulting scraping of non-castering wheels of the truck on the floor.

In either event, wear of the tires of the wheels, or in some instances shearing of the tires from the wheels, results if this scraping or scuffing of the wheels on the floor is excessive.

While various arrangements have been proposed to decrease the force exerted on the tire of a caster wheel during turning, such arrangements have been directed to decreasing the contact area of the tire with the floor during turning by allowing tilting of the caster wheel. Two such arrangements are shown in United States Patent No. 2,793,875 and United States Patent No. 2,753,946. While these arrangements do decrease the friction between the caster wheel and the floor so as to decrease the resistance to turning the caster wheel and improve the castering action, such arrangements do not eliminate or materially reduce the scraping of the tires of the wheels on the floor. The purpose of this invention, therefore, is to provide an arrangement which will eliminate or materially reduce undesirable scraping of either the non-castering wheels or the caster wheel when the direction of the truck is reversed, so as to decrease tire wear and reduce the possibility of the tires being sheared.

To this end, the arrangement of the invention includes means mounting the complete caster wheel unit, including its caster axis or pivot, for lateral movement relatively to the truck in each direction from a center position. This permits movement of the caster axis or pivot relatively to the truck frame so as to eliminate or materially reduce the scraping of either the non-castering wheels or the caster wheel as the caster wheel swings 180° about its caster axis during reversal of the truck. Naturally, this also reduces the forces tending to shear the tires from the wheels.

As a further feature of the invention, the truck frame is suspended from the caster wheel unit on means formed so that the weight of the truck holds the caster unit yieldingly in a center position during normal forward and reverse operation, while allowing relative lateral movement between the caster unit and the truck frame to reduce scraping of the wheels on the floor during reversing of the truck.

The invention and its advantages having been broadly described, a more detailed description of one embodiment of the invention is given hereafter by reference to the accompanying drawings.

FIG. 1 is the perspective view of an industrial truck incorporating a caster wheel unit mounted in accordance with the invention;

FIG. 2 is a sectional view taken on the line 2—2 of FIG. 1;

FIG. 3 is a sectional view taken on the line 3—3 of FIG. 2;

FIG. 4 is a sectional view taken on the line 4—4 of FIG. 3;

FIG. 5 is a view similar to that of FIG. 2, but showing only that portion of the truck incorporating the caster wheel, and showing the caster wheel turned through 90°;

FIG. 6 is a sectional view taken on the line 6—6 of FIG. 2; and

FIG. 7 is a sectional view taken on the line 7—7 of FIG. 5.

Referring to the drawings, and in particular to FIG. 1, there is shown a truck 10 incorporating a caster unit 11 mounted on the truck in accordance with the invention.

The particular truck illustrated is of the general type disclosed in United States Patent No. 2,793,875 to George F. Quayle. While the invention is described hereafter in conjunction with such a truck, it will be appreciated that this is for the purpose of illustration and that the caster unit mounting of the invention may be used on various types and styles of industrial trucks. It is sufficient, therefore, to point out that the truck 10 is a lift truck of the straddle type having a pair of laterally spaced legs 12 and having lift forks 13 mounted on a mast structure 14 for vertical movement down between the legs 12 to engage or deposit a load on the floor.

The truck 10 is supported at its forward end by wheels 15 carried adjacent the outer ends of each leg 12, and is supported at its rear end by the caster unit 11 on one side and by a combined steering and traction wheel 16 on the other side. The steering and traction wheel 16 is driven by a suitable motor, not shown, and is steered by a handle 17.

As best shown in FIGS. 2 and 3, the particular caster unit 11 illustrated is of a dual wheel type incorporating two wheels 18 which are mounted for rotation on a common horizontal axle 19. The axle 19 extends between and is secured to opposed arms 20 and 21 of a fork member 22. The fork member 22 in turn has a vertical shaft portion 23 which is welded or otherwise secured to the top thereof and which extends, as best shown in FIG. 4, through a bearing 24 carried by a horizontal mounting plate 25 to provide a pivot structure through which the wheels 18 may pivot or swivel relatively to the plate 25 around a vertical caster axis, identified as X—X in FIG. 4. The bearing 24 is held assembled in the plate 25 between an integral shoulder 26 of the plate 25 and a suitable split ring retainer 27, best shown in FIGS. 6 and 7. The shaft portion 23 of the fork member 22 is secured against downward endwise movement out of the bearing 24 by means of a split ring retainer 28.

In accordance with the usual practice in caster wheel construction, the axle 19 about which the wheels 18 rotate is spaced or offset laterally from the caster axis X—X as shown in FIG. 4 by the space between the axis X—X and an axis Y—Y which extends through the axle 19. It will be appreciated that if the direction of the movement of the truck is completely reversed, the wheels 18 must swing or swivel 180° about the axis X—X, and that for this to happen, the wheels 18 must swing from a position in longitudinal alignment with the caster axis X—X as shown in FIG. 2 through a transverse or 90° position as shown in FIG. 5 in which the axle 19 of the wheels 18 is offset laterally from the caster axis X—X.

With caster wheel arrangements as heretofore proposed in which the caster axis is fixed relatively to the truck frame, it is necessary in order for the caster wheel to swing through this transverse or 90° position for the caster wheels to either scrape on the floor or for the truck frame to shift sidewise relatively to the floor with resulting scraping of the non-casting wheels. In accordance with this invention, such scraping of the tires on the floor is eliminated or materially reduced by mounting the caster axis or pivot of the caster wheels for lateral movement relatively to the truck frame in either direction from a center position. With this arrangement, the caster axis or pivot, rather than the truck frame or caster wheels, moves laterally relatively to the floor so that scraping of the caster wheels or non-castering wheels is eliminated or materially reduced.

In the form of the invention as illustrated in the drawings, this lateral movement of the caster axis X—X is provided by suspending the truck frame 29 from the mounting plate 25 by links 30 and 31 which are provided on opposite sides of the plate 25 and are pivotally secured at their upper end lower ends to the plate 25 and the frame 29, respectively, to allow lateral movement of the plate 25 relatively to the truck frame 29. As best shown in FIGS. 2, 3, 6 and 7, the upper ends of the links 30 and 31 are pivotally secured to the plate 25 by means of pins 32 and 33 which extend through ears 34 and 35 formed integrally with plate 25, and the lower ends of the links 30 and 31 are pivotally secured to the truck frame 29 by means of pins 36 and 37 which extend through ears 38 and 39 welded or otherwise rigidly secured to the frame 29.

By this arrangement, the plate 25, bearing 24 and shaft portion 23 may move bodily transversely of the truck by swinging of the links 30 and 31 as shown in FIG. 7, with resulting movement of the caster axis X—X laterally relatively to the floor and truck frame as the caster wheels 18 swing about the caster axis X—X. Scraping of the caster wheels 18 or the non-castering wheels 15 and 16 on the floor therefore is eliminated or materially reduced. It will also be appreciated that when the forces shifting the caster axis X—X laterally of the truck are relieved, the weight of the truck frame will urge links 30 and 31 again to the vertical position as shown in FIG. 3 so as to return the caster axis X—X to a centered position.

From the preceding description, it can be seen that there is provided a novel mounting for a caster unit of an industrial truck which will eliminate or materially reduce scraping of the caster or non-castering wheels of the truck when the direction of movement of the truck is reversed, so as to increase tire wear and reduce the possibility of the tires being sheared from the wheels.

While one form of the invention has been shown and described, it will be appreciated that this is for the purpose of illustration and that changes and modifications can be made therein without departing from the spirit and scope of the invention.

I now claim:

1. An industrial truck having a frame and wheels supporting said frame, one of said wheels being a caster wheel having a caster pivot through which the caster wheel may swing as the direction of movement of the truck is changed, pivotally mounted links suspending said frame from said caster pivot whereby said caster pivot may move laterally relatively to said frame in either direction from a center position by pivoting of said links as the caster wheel swing about the caster pivot, and the weight of the truck acting through said links serving to urge said caster pivot to said center position after a change in the direction of movement of the truck.

2. An industrial truck having a frame and wheels supporting said frame, one of said wheels being a caster wheel having a caster pivot through which the caster wheel may swing as the direction of movement of the truck is changed, means connected between said frame and said caster pivot for constantly urging said caster pivot to a center position while allowing bodily lateral movement of said caster pivot relatively to said frame in either direction from a center position as the caster wheel swings about the caster pivot, whereby said caster pivot moves laterally of said frame during a change in the direction of movement of the truck and is returned to said center position after a change in direction of movement of the truck.

3. An industrial truck having a frame and wheels supporting said frame, one of said wheels being a caster wheel having a caster pivot through which the caster wheel may swing as the direction of movement of the truck is changed, means suspending said frame from said caster pivot for relative swinging movement, whereby said frame in effect hangs from said caster pivot and is supported thereby whereby said caster pivot may move bodily laterally relatively to said frame in either direction from a center position as the caster wheel swings about the caster pivot, and the weight of the truck acting through said suspending means urging said caster pivot to said center position.

References Cited in the file of this patent

UNITED STATES PATENTS

| | | |
|---|---|---|
| 1,589,104 | Bull | June 15, 1926 |
| 2,793,875 | Quayle | May 28, 1957 |